United States Patent [19]

Iguchi et al.

[11] Patent Number: 5,303,345
[45] Date of Patent: Apr. 12, 1994

[54] METHOD FOR CONTROLLING DATA SENDING AND RECEIVING OPERATIONS OF A MICROPROCESSOR

[75] Inventors: Kesayoshi Iguchi, Fujisawa; Takashi Kondoh; Keiichi Nambu, both of Yokohama, all of Japan

[73] Assignee: Matsushita Electric Industrial Co., Ltd., Osaka, Japan

[21] Appl. No.: 735,900

[22] Filed: Jul. 25, 1991

[30] Foreign Application Priority Data

Jul. 30, 1990 [JP] Japan ............................ 2-202103

[51] Int. Cl.$^5$ .................. G06F 15/16; G06F 13/00
[52] U.S. Cl. ............................ 395/200; 395/325; 364/DIG. 1; 364/229; 364/259.9; 364/931.4; 364/940.61; 364/942.8
[58] Field of Search ............... 395/200, 800, 325

[56] References Cited

U.S. PATENT DOCUMENTS

| | | | |
|---|---|---|---|
| 4,130,868 | 12/1978 | Heuer et al. | 364/DIG. 1 |
| 4,149,245 | 4/1979 | Gannon et al. | 364/DIG. 1 |
| 5,088,024 | 2/1992 | Vernon et al. | 364/DIG. 1 |

Primary Examiner—Eddie P. Chan
Attorney, Agent, or Firm—Stevens, Davis, Miller & Mosher

[57] ABSTRACT

A method of controlling data sending and receiving operations between two microprocessors, in which a second controlled-side microprocessor receives a selected signal which is one of a data sending request signal and a data receiving request signal from a first controlling-side microprocessor and the second microprocessor also receives a resultant select signal produced by a logical OR operation on both request signals and determines if the selected signal indicates a "receiving request" or a "sending request" at the same time that it responds to the resultant select signal, thereby executing the requested operation. Hence, even if the second microprocessor does not receive the resultant select signal and the sending/receiving signal at the same time, the second microprocessor can determine simultaneously with the receipt of the resultant select signal if it should send or receive the data, resulting in high-speed data processing.

1 Claim, 3 Drawing Sheets

F I G. 2
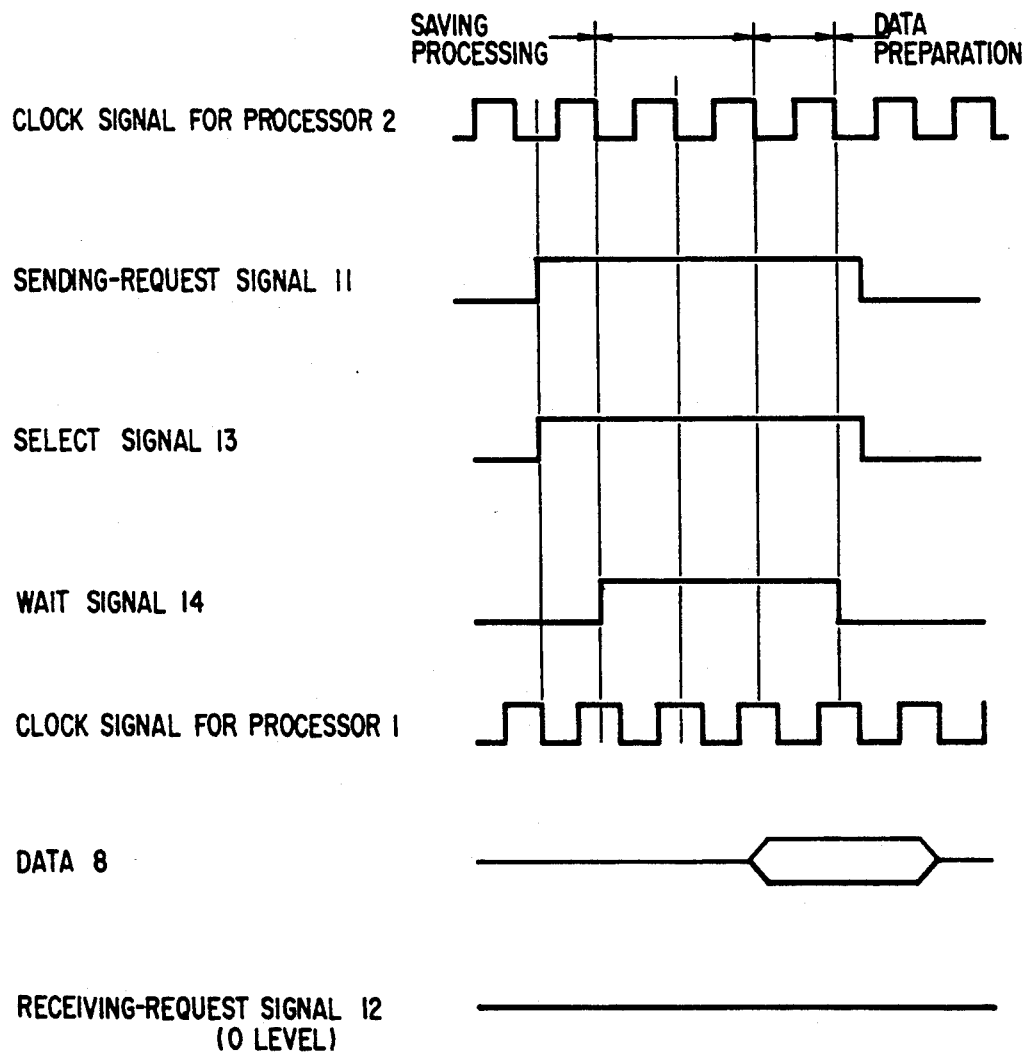

METHOD FOR CONTROLLING DATA SENDING AND RECEIVING OPERATIONS OF A MICROPROCESSOR

BACKGROUND OF THE INVENTION

The present invention relates to a method for controlling microprocessors which enables a high speed transfer of data between microprocessors.

FIG. 3 is a block diagram showing a conventional processing system for transferring data between two microprocessors.

As shown, between a first microprocessor 1 and a second microprocessor 2, five lines and the data bus are shown respectively for transferring a select signal 3 for the microprocessor 2 (referred to as an MP2 select signal), a select signal 4 for the microprocessor 1 (referred to as an MP1 select signal), a busy signal 5 for the microprocessor 1 (referred to as an MP1 busy signal), a busy signal 6 for the microprocessor 2 (referred to as an MP2 busy signal), a clock signal 7, and data 8.

The number of the data lines contained in the data bus corresponds to the number of processing bits of the microprocessors. The additional lines respectively for the other signals and the clock signal, and a ground line (not shown) used in common to each line are provided between the microprocessors 1 and 2.

Next, the operation of the arrangement shown in FIG. 3 will be described with reference to FIG. 4.

In order to transfer data from the microprocessor 1 to the microprocessor 2, for example, at first, the microprocessor 1 checks the MP2 busy signal 6 sent from the microprocessor 2 and determines whether or not the microprocessor 2 is in a data-receivable state.

When the processor 1 determines that the MP2 busy signal 6 indicates a non-busy state of the microprocessor 2, the microprocessor 1 sends out the MP2 select signal 3 to the microprocessor 2. The microprocessor 2 enters into a data-receivable state in response to the MP2 select signal 3.

On the other hand, the microprocessor 1 outputs data 8 in synchronism with the clock signal 7. The microprocessor 2 receives the data 8 in synchronism with the clock signal 7 (the leading edge of the clock signal).

In the converse case, that is, in the case of transferring data from the microprocessor 2 to the microprocessor 1, like operations are carried out by using the MP1 select signal 4 and the MP1 busy signal 5 in place of the MP2 select signal 3 and the MP2 busy signal 6.

The foregoing arrangement, however, needs to synchronize the microprocessors, resulting in taking a certain length of time to send and receive data. Hence, the arrangement is limited with respect to achieving a higher speed operation for sending and receiving data between the microprocessors.

SUMMARY OF THE INVENTION

It is an object of the present invention to provide a method for controlling microprocessors which enables a higher speed transfer of data between microprocessors.

According to one aspect of the invention, a method for controlling at least one microprocessor by another microprocessor is provided which comprises the steps of sending one of a data sending request signal and a data receiving request signal from a controlling side microprocessor to a controlled side microprocessor, producing and sending from the controlling side microprocessor to the controlled side microprocessor a select signal responsive to the sent one signal, causing the controlled side microprocessor responsive to the select signal to determine whether the received one request signal indicates a sending request or a receiving request, and controlling the controlled side microprocessor according to the determined result.

According to the invention, hence, the controlled side microprocessor knows that it is selected on the basis of the select signal sent from the controlling side microprocessor and determines by checking the sending/receiving request signal if it should send or receive data. The foregoing prior art makes it possible to know only that it is selected. According to the present invention, the controlled side microprocessor can determine if it should send or receive the data when it is selected, resulting in data transfer operations at higher speeds.

BRIEF DESCRIPTION OF THE DRAWINGS

FIG. 2 is a timing chart showing the operation of the arrangement shown in FIG. 1;

DESCRIPTION OF THE PREFERRED EMBODIMENTS

Figure 1:
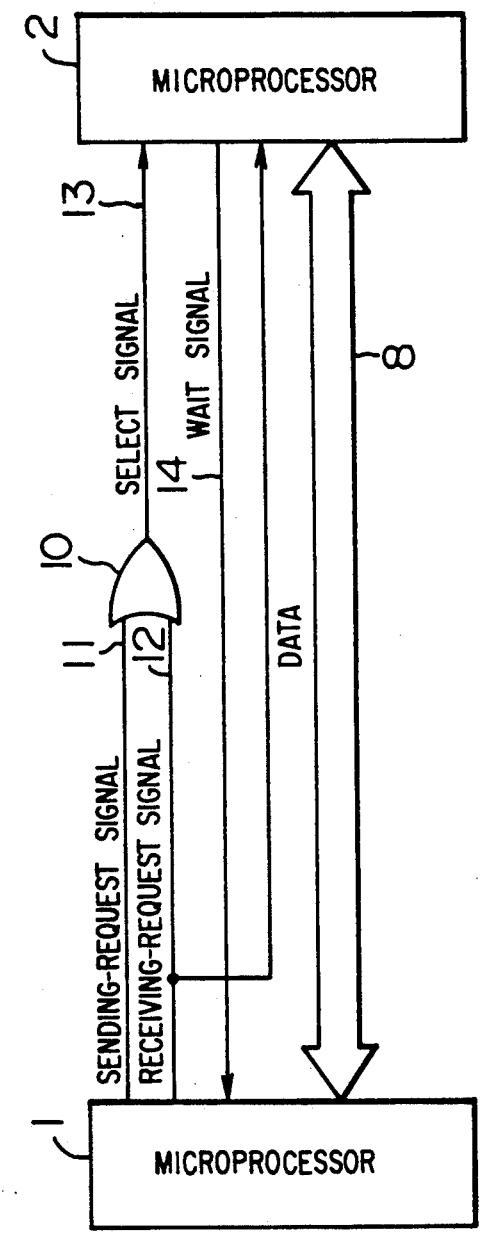
FIG. 1 is a block diagram showing a preferred processing system to which a method for controlling a microprocessor may be applied according to an embodiment of the invention.
Figure 3:
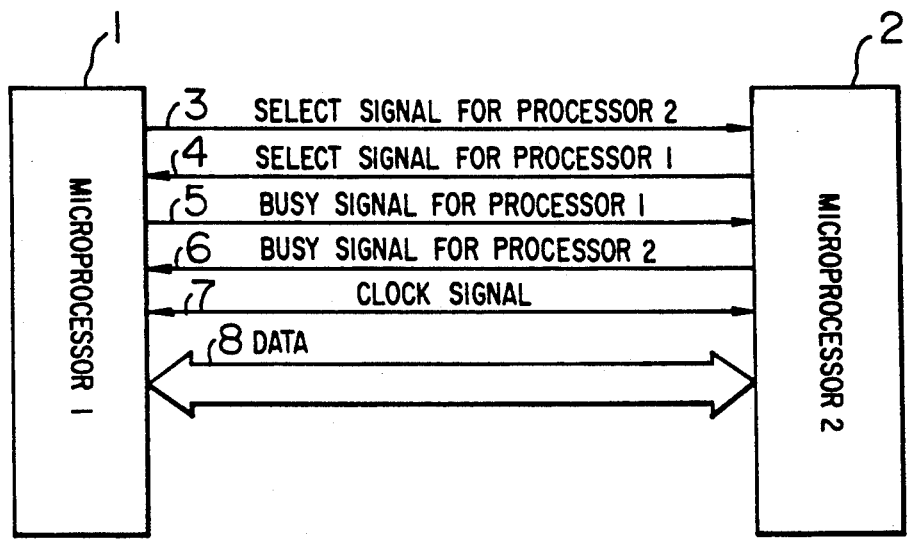
FIG. 3 is a block diagram showing a conventional processing system for transferring data between two microprocessors.
Figure 4:
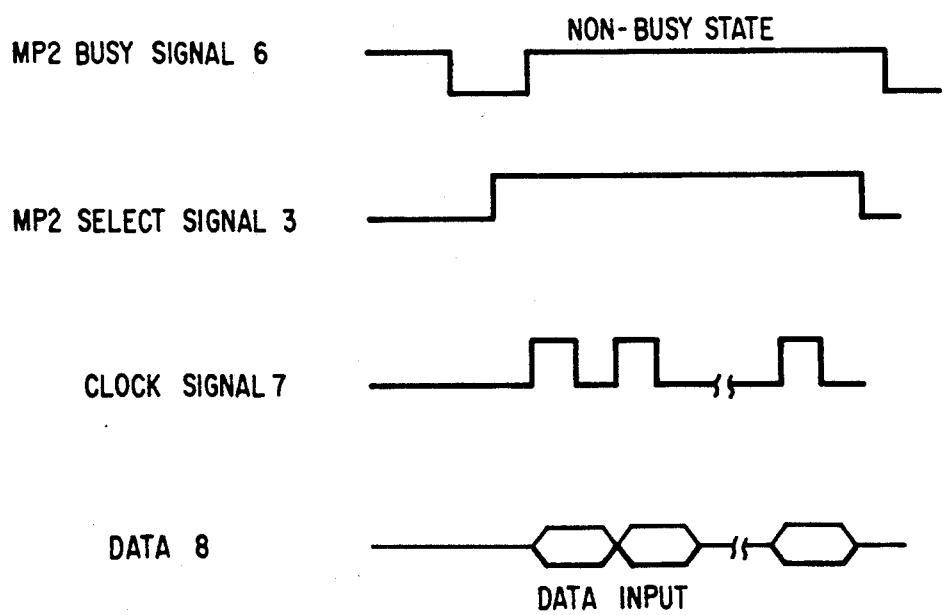
FIG. 4 is a timing chart showing the operation of the arrangement shown in FIG. 3.

FIG. 1 is a data processing system to which the present invention is preferably applied. In the present embodiment, the same components as those shown in FIG. 3 are indicated by the same reference numerals and are not explained. The description thus will be directed to the different components shown in FIG. 2 from those shown in FIG. 3.

One important feature of the present embodiment resides in providing means for generating from a microprocessor 1 a sending request signal 11 and a receiving request signal 12, an OR circuit 10 for taking a logical OR of the sending request signal 11 and the receiving request signal 12 to produce and send a resulting select signal 13 to a microprocessor 2, and means for sending a wait signal from the microprocessor 2 to the microprocessor 1.

Next, the method for controlling the arrangement shown in FIG. 1 will be described with reference to a timing chart shown in FIG. 2.

At first, assuming that the microprocessor 1 is to receive data from the microprocessor 2, the microprocessor 1 generates the sending request signal 11 (outputs the "1" level signal) and keeps the receiving request signal 12 at the off level (keeps the signal at "0" level). The sending request signal 11 is passed through the OR circuit 10 in which it is changed to the select signal 13 ("1" level) and then to the microprocessor 2.

The microprocessor 2 identifies that it is requested to receive or send data in response to the select signal 13. Simultaneously, the microprocessor 2 reads and checks the receiving request signal 12. If the receiving request signal 12 is of low level ("0"), the microprocessor 2 is adapted to determine that it is requested to "send" the data. If the receiving request signal 12 is of high level ("1"), the microprocessor 2 is adapted to determine that it is requested to "receive" the data.

The microprocessor is normally operated in synchronism with to a respective clock signal. In response to the request signal, thus, the microprocessor 2 is adapted to detect the select signal 13 at a next coming clock signal, interrupt its executed operation at once, and prepare sending of the data. In order to keep the microprocessor 1 in a waiting state until the preparation operation for sending the data is completed, the microprocessor 2 sends out a wait signal to the microprocessor 1. Upon completion of the preparation operation for sending the data, the microprocessor 2 releases the wait signal 14 and sends out the data.

While receiving the wait signal, the microprocessor 1 interrupts its executed operation and starts the interrupted operation after the wait signal is released.

The foregoing operation concerns the case where the microprocessor 1 generates the sending request signal 11. In the other case where the microprocessor 1 generates the receiving request signal 12, a similar operation can be clearly carried out with the desired advantage.

Although conventional microprocessors have a capability of generating independently the select signal and the sending/receiving request signal, they generate the request signal with a delay of a few clocks after the receipt of the select signal. Accordingly, the controlled side microprocessor can not determine simultaneously with the receipt of the select signal if it should send or receive the data.

It will be apparent from the above description, however, that the present invention proposes to produce the select signal on the basis of the sending/receiving request signal, thereby enabling the concurrent identification of the receipt of the select signal and the sending-/receiving request signal. The invention thus enables a higher speed data processing.

What is claimed is:

1. A method of controlling data sending and receiving operations between first and second microprocessors, said method comprising the steps of:
    (a) sending a selected signal which is one of a data sending request signal and a data receiving request signal from the first microprocessor to the second microprocessor;
    (b) producing a resultant select signal based upon a result of a logical OR operation on the data sending request signal and the data receiving request signal;
    (c) sending the resultant select signal to the second microprocessor;
    (d) causing the second microprocessor to respond to the resultant select signal and the selected signal to determine if the selected signal signifies one of a data receiving request and a data sending request; and
    (e) controlling data sending and receiving operations of the second microprocessor according to a determination result of step (d).

* * * * *